(12) United States Patent
Uehara et al.

(10) Patent No.: US 11,574,653 B2
(45) Date of Patent: Feb. 7, 2023

(54) DISK DEVICE AND METHOD OF MANUFACTURING DISK DEVICE

(71) Applicants: Kabushiki Kaisha Toshiba, Tokyo (JP); Toshiba Electronic Devices & Storage Corporation, Tokyo (JP)

(72) Inventors: Manabu Uehara, Kawasaki Kanagawa (JP); Yasutaka Sasaki, Tokyo (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/690,969

(22) Filed: Mar. 9, 2022

(65) Prior Publication Data
US 2022/0399041 A1   Dec. 15, 2022

(30) Foreign Application Priority Data
Jun. 14, 2021  (JP) .............................. JP2021-098869

(51) Int. Cl.
| | |
|---|---|
| *G11B 5/48* | (2006.01) |
| *G11B 21/12* | (2006.01) |
| *H02K 5/16* | (2006.01) |
| *G11B 5/54* | (2006.01) |
| *G11B 33/02* | (2006.01) |

(52) U.S. Cl.
CPC ............ *G11B 21/12* (2013.01); *G11B 5/4813* (2013.01); *G11B 5/54* (2013.01); *H02K 5/165* (2013.01); *G11B 33/022* (2013.01); *G11B 2220/2516* (2013.01)

(58) Field of Classification Search
None
See application file for complete search history.

(56) References Cited

U.S. PATENT DOCUMENTS

| | | | | | |
|---|---|---|---|---|---|
| 4,367,546 | A | * | 1/1983 | Shibata .............. | G11B 19/2009 369/271.1 |
| 4,984,115 | A | * | 1/1991 | Takahashi .............. | G11B 33/08 360/99.08 |
| 5,392,176 | A | * | 2/1995 | Anderson .......... | G11B 19/2009 |

(Continued)

FOREIGN PATENT DOCUMENTS

| | | |
|---|---|---|
| JP | S60-77795 U | 5/1985 |
| JP | H3-130977 A | 6/1991 |

(Continued)

*Primary Examiner* — Peter Vincent Agustin
(74) *Attorney, Agent, or Firm* — Allen & Overy LLP

(57) ABSTRACT

According to one embodiment, a disk device includes a housing including a base with a bottom wall, a drive motor including a pivot erected on the bottom wall and a hub rotatably supported around the pivot, ten or more magnetic disks attached to the hub and stacked on a flange of the hub, and spacer rings attached to the hub and each disposed between each respective adjacent pair of two magnetic disks. A number of the spacer rings is one less than the magnetic disks. At least one spacer ring has a thickness different from that of the other spacer rings, and a difference between a maximum thickness and a minimum thickness of the spacer rings is 0.01 mm or more and 0.09 mm or less.

8 Claims, 12 Drawing Sheets

(56) References Cited

U.S. PATENT DOCUMENTS

| | | | | |
|---|---|---|---|---|
| 5,512,725 A * | 4/1996 | Kelemen | ............... | G11B 25/043 |
| | | | | 219/121.64 |
| 5,550,687 A * | 8/1996 | Suzuki | ................. | G11B 17/038 |
| | | | | 360/98.02 |
| 5,563,749 A * | 10/1996 | Bicknese | ............. | G11B 25/043 |
| | | | | 360/99.12 |
| 5,606,474 A * | 2/1997 | Ketchersid, III | .... | G11B 33/121 |
| 6,005,747 A * | 12/1999 | Gilovich | ............. | G11B 25/043 |
| 6,008,966 A * | 12/1999 | Forbord | ................ | G11B 33/022 |
| 6,040,957 A | 3/2000 | Konings | | |
| 6,798,613 B1 | 9/2004 | Krajnovich et al. | | |
| 2001/0010607 A1 * | 8/2001 | Kitagawa | ............. | G11B 21/025 |
| | | | | 360/75 |
| 2003/0165033 A1 * | 9/2003 | Sasaki | ................... | G11B 5/5569 |
| 2005/0050935 A1 | 3/2005 | Miyahara | | |
| 2009/0268341 A1 * | 10/2009 | Chan | .................... | G11B 33/148 |
| | | | | 360/97.13 |
| 2020/0258540 A1 * | 8/2020 | Uehara | ................ | G11B 25/043 |

FOREIGN PATENT DOCUMENTS

| | | |
|---|---|---|
| JP | H9-106622 A | 4/1997 |
| JP | 2004-167547 A | 6/2004 |

* cited by examiner

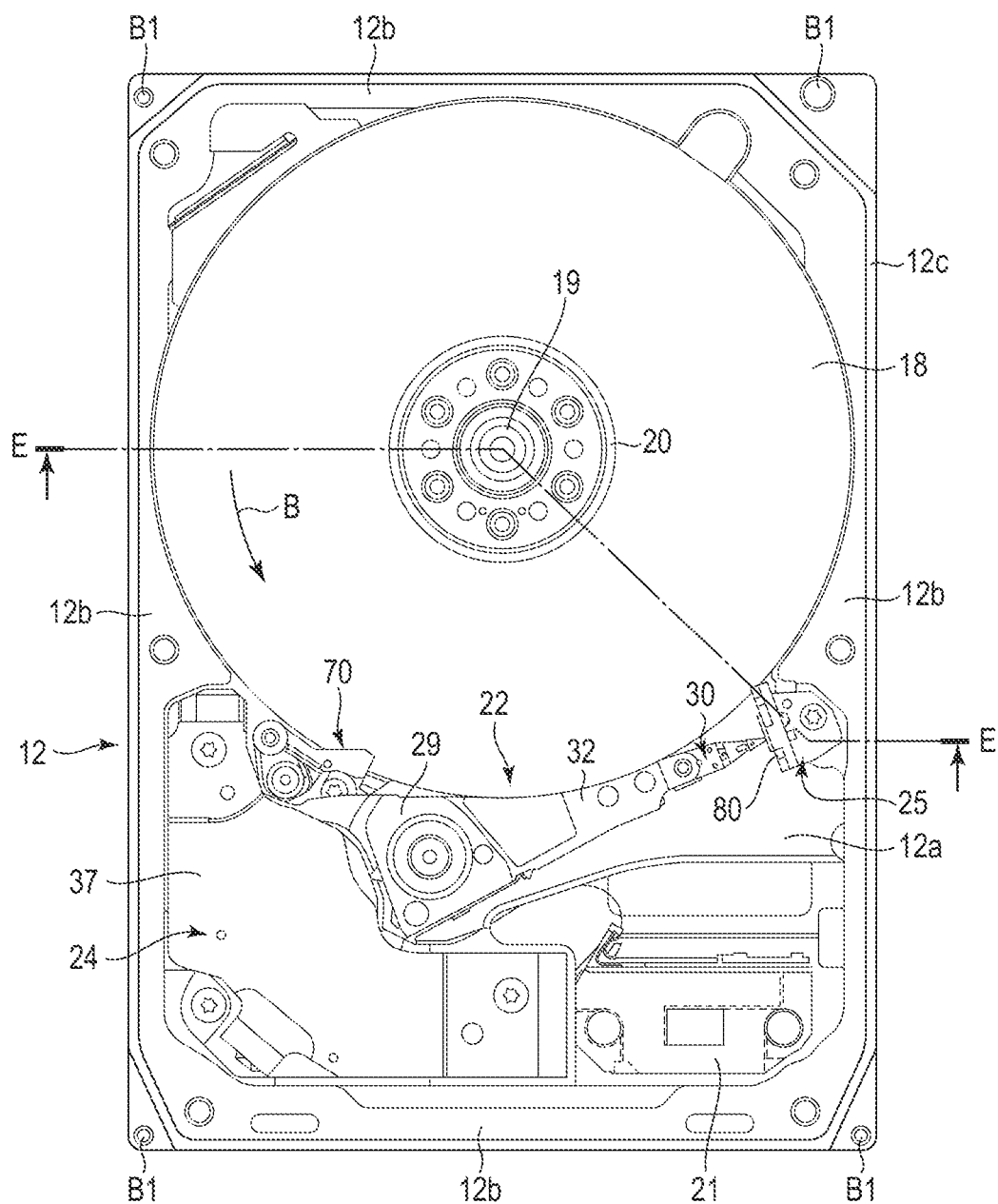
F I G. 2

F.I.G. 3

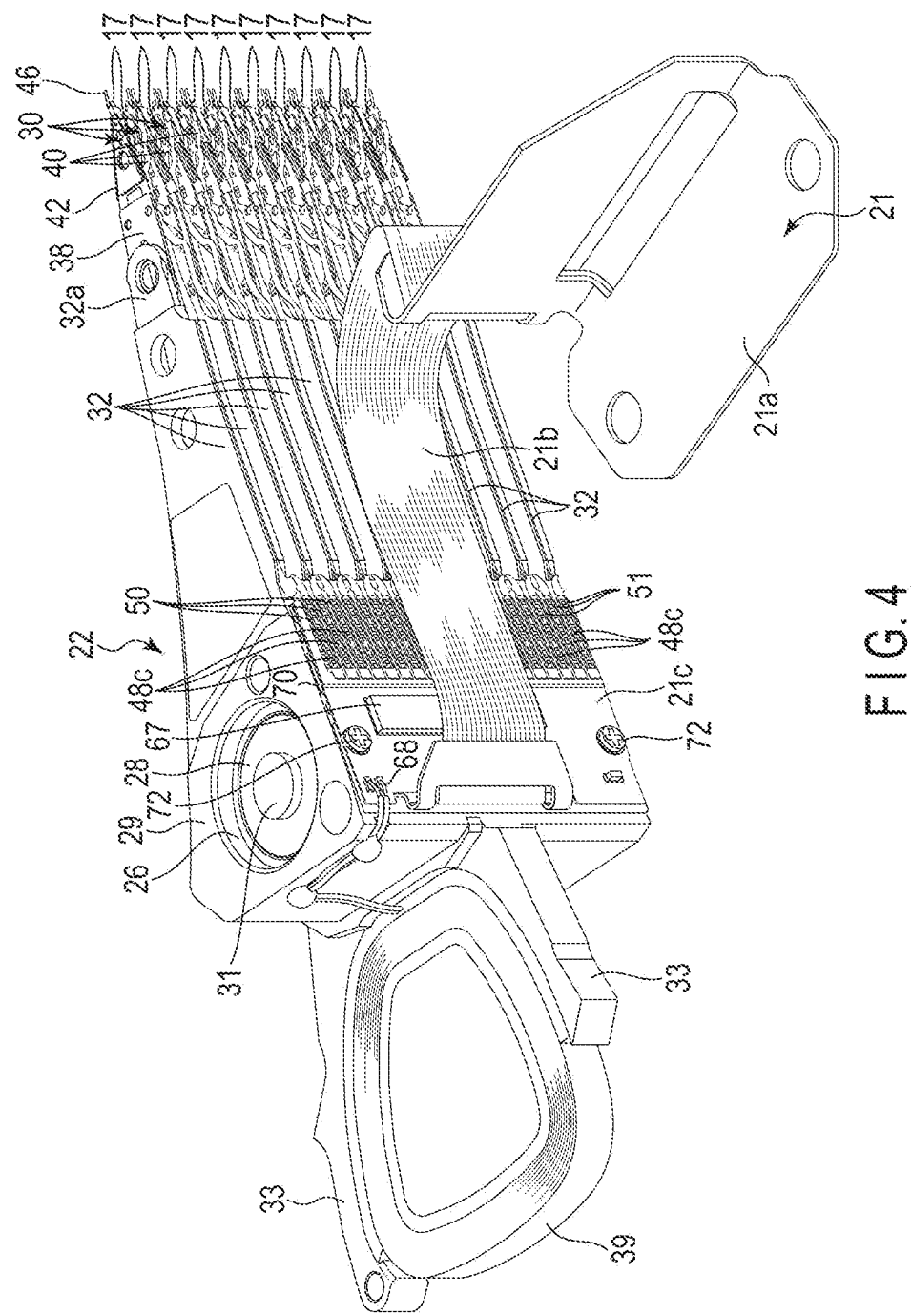
F I G. 4

DISK DEVICE AND METHOD OF MANUFACTURING DISK DEVICE

CROSS-REFERENCE TO RELATED APPLICATIONS

This application is based upon and claims the benefit of priority from Japanese Patent Application No. 2021-098869, filed Jun. 14, 2021, the entire contents of which are incorporated herein by reference.

FIELD

Embodiments described herein relate generally to a disk device and a method of manufacturing a disk device.

BACKGROUND

As a disk device, for example, a hard disk drive (HDD) includes a drive motor provided in a housing and a plurality of rotatable magnetic disks stacked on a hub of the drive motor. Spacer rings are disposed between adjacent magnetic disks.

As described above, in the case in which a plurality of magnetic disks and spacer rings are alternately stacked, the stacked height may vary due to manufacturing errors of constituent members. Specifically, since the manufacturing errors of the parts of the magnetic disk are accumulated on the uppermost part, there is a possibility that position error (displacement) to the set value becomes large.

BRIEF DESCRIPTION OF THE DRAWINGS

FIG. 2 is a plan view of the HDD.

FIG. 4 is a perspective view showing a head actuator assembly and an FPC unit of the HDD.

DETAILED DESCRIPTION

Figure 1:
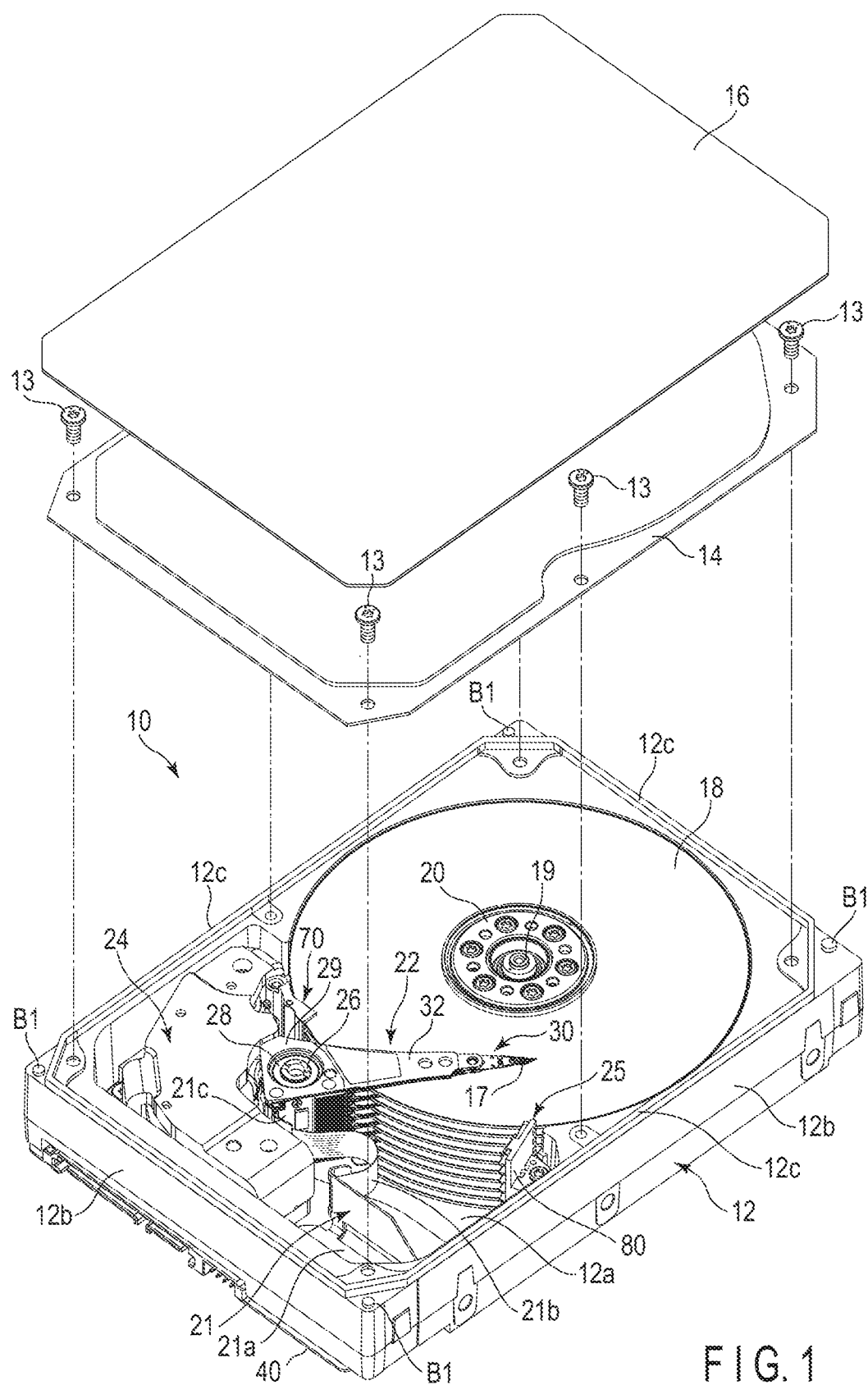
FIG. 1 is an exploded perspective view showing a hard disk drive (HDD) according to a first embodiment with its top cover disassembled.

Various embodiments will be described hereinafter with reference to the accompanying drawings. In general, according to one embodiment, a disk device comprises: a housing comprising a base with a bottom wall; a drive motor comprising a pivot erected on the bottom wall, and a hub rotatably supported around the pivot, the hub including an outer circumferential surface coaxially located with the pivot and an annular flange provided at an end portion of the outer circumferential surface on a side of the bottom wall; ten or more magnetic disks attached to the hub and stacked on the flange; and a plurality of spacer rings attached to the hub and each disposed between each respective adjacent pair of two magnetic disks, the spacer rings being stacked on the flange together with the magnetic disks, a number of the spacer rings being one less than the magnetic disks. At least one spacer ring has a thickness different from that of the other spacer rings, and a difference between a maximum thickness and a minimum thickness of the spacer rings is 0.01 mm or more and 0.09 mm or less.

Note that the disclosure is merely an example, and proper changes within the spirit of the invention, which are easily conceivable by a skilled person, are included in the scope of the invention as a matter of course. In addition, in some cases, in order to make the description clearer, the widths, thicknesses, shapes, etc., of the respective parts are schematically illustrated in the drawings, compared to the actual modes. However, the schematic illustration is merely an example, and adds no restrictions to the interpretation of the invention. Besides, in the specification and drawings, the same elements as those described in connection with preceding drawings are denoted by like reference numerals, and a detailed description thereof is omitted unless otherwise necessary.

First Embodiment

As a disk device, a hard disk drive (HDD) according to a first embodiment will be described in detail.

FIG. 1 is an exploded perspective view of the HDD according to the first embodiment with the cover disassembled, and FIG. 2 is a plan view of the HDD with the cover removed.

As shown in FIG. 1, the HDD comprises substantially a rectangular-shaped housing 10. The housing 10 includes a rectangular box-shaped base 12 whose upper surface is opened, an inner cover 14 screwed to the base 12 with a plurality of screws 13 and closing an upper edge opening of the base 12 and an outer cover (a top cover) 16 disposed to be overlaid on the inner cover 14, whose circumferential portion is welded to the base 12. The base 12 includes a rectangular-shape bottom wall 12a opposing the inner cover 14 with a gap therebetween and a side wall 12b provided to stand along the circumference of the bottom wall 12a, formed to be integrated as one body, for example, aluminum alloy. The side wall 12b includes a pair of long side walls opposing each other and a pair of short side walls opposing each other. On an upper end surface of the side wall 12b, a substantially rectangular frame-shaped fixation rib 12c is provided to project therefrom.

Positioning bosses B1 are provided on the upper surfaces of the four corners of the side wall 12b. The upper surfaces of the four positioning bosses B1 are flattened so as to be located at the same height and the same plane, and form a height reference plane.

The inner cover 14 is formed of, for example, stainless steel into a rectangular plate, shape. The inner cover 14 is fixed inside the fixation rib 12c by screwing the circumferential portion of the cover to the upper end surface of the side wall 12b with screws 13. The outer cover 16 is formed, for example, of aluminum into a rectangular plate shape. The outer cover 16 has planer dimensions slightly greater than those of the inner cover 14. The circumferential portion of the outer cover 16 is welded to the fixation rib 12c of the base 12 over the entire circumference, and thus airtightly fixed to the base 12. The airtightly closed housing 10 is filled with a low-density gas having a density lower than that of air, for example, helium (He).

Note that a height (thickness) H (see FIG. 3) of the housing 10 is formed in 26.1 mm or less at the maximum in conformance with the 3.5-inch HDD standard.

In the housing 10, a plurality of recording media in a disk shape, for example, ten magnetic disks 18 and a spindle motor 19 as a drive motor that supports and rotates magnetic disk 18 are provided. The spindle motor 19 is disposed on the bottom wall 12a. The magnetic disks 18 each have a substrate that is formed in a disk shape having a diameter of 96 mm (3.5 inches) and a thickness of 0.5 to 0.635 mm and that is made of a non-magnetic material such as glass or aluminum, and a magnetic recording layer formed on the upper surface (first surface) and lower surface (second surface) of the substrate. In the present embodiment, an aluminum substrate is used. The magnetic disks 18 are each coaxially fitted to a hub, described later, of the spindle motor 19 and further clamped by a clamp spring 20. Thus, the magnetic disk 18 is supported to be located parallel to the bottom wall 12a of the base 12. The magnetic disks 18 are rotated at a predetermined number of revolutions by the spindle motor 19. Note that the number of magnetic disks 18 mounted is not limited to 10, and may be nine or less, or 11 or more.

As shown in FIGS. 1 and 2, in the housing 10 are provided a plurality of magnetic heads 17 which record and reproduce data with respect to the respective magnetic disks 18, and an actuator assembly 22 supporting the magnetic heads 17 to be movable relative to the respective magnetic disks 18. Further, in the housing 10 are provided a voice coil motor (VCM) 24 which pivots and positions the actuator assembly 22, a ramp load mechanism 25 which maintains, when a magnetic head 17 moves to an outermost circumference of the respective magnetic disk 18, the magnetic head 17 at an unload position spaced from the magnetic disk 18, a flexible printed circuit unit (FPC unit) 21 on which electronic components such as conversion connectors and the like are mounted, and a spoiler 70.

Figure 3:
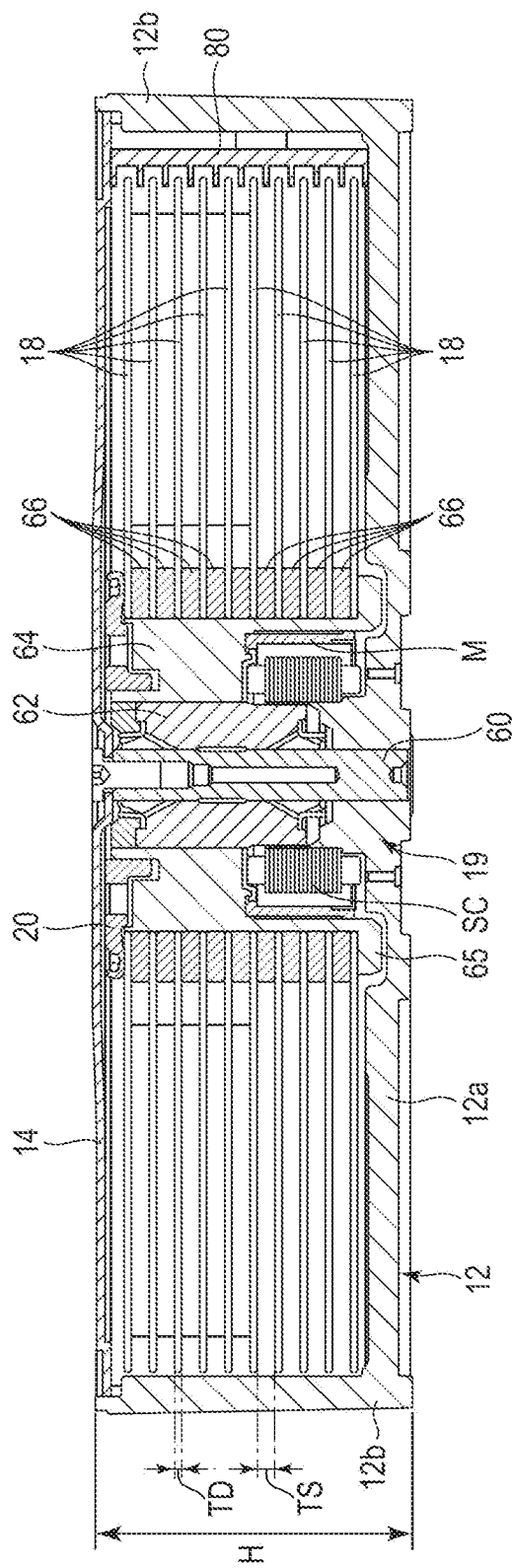
FIG. 3 is a cross-sectional view of the HDD taken along line E-E in FIG. 2.

A printed circuit board 41 is screwed to the outer surface of the bottom wall 12a of the base 12. The printed circuit board 41 constitutes a control unit that controls the operation of the spindle motor 19 and controls the operations of the VCM 24 and the magnetic head 17 through the FPC unit 21. FIG. 3 is a cross-sectional view of the HDD taken along line E-E in FIG. 2. In one example, the spindle motor 19 has a pivot 60 erected approximately perpendicular to the bottom wall 12a, a rotating shaft 62 in a cylindrical shape rotatably supported around the pivot 60, a hub 64 in a substantially cylindrical shape coaxially fixed around the rotating shaft 62, a stator coil SC fixed to the bottom wall 12a and disposed around the rotating shaft 62, and a cylindrical magnet M attached to the inner circumferential surface of the hub 64 and opposite to the stator coil SC. The hub 64 has an outer circumferential surface coaxially positioned with the pivot 60 and an annular flange 65 integrally formed at the lower end of the outer circumferential surface (the end on the bottom wall 12a side).

The magnetic disk 18 is engaged with the outer circumferential surface of the hub 64 with the hub 64 inserted in the inner hole of the magnetic disk 18. To the outer circumferential surface of the hub 64, an annular spacer ring 66 is attached and is sandwiched between two adjacent magnetic disks 18. The magnetic disks 18 and the spacer rings 66 are sequentially disposed on the flange 65 of the hub 64, and are mounted on the hub 64 in an alternately overlapping state. The clamp spring 20 in a disk shape is attached to the upper end of the hub 64. The clamp spring 20 presses the inner circumferential part of the plurality of magnetic disks 18 and the spacer ring 66 toward the flange 65. As a result, the plurality of magnetic disks 18 is fixed in a stacked state with predetermined intervals. The ten magnetic disks 18 are supported to be rotatable integrally with the rotating shaft 62 and the hub 64. The ten magnetic disks 18 are supported at predetermined intervals parallel to each other and substantially parallel to the bottom wall 12a.

The height (thickness) H of the housing 10 is formed in a maximum of 26.1 mm in conformance with the HDD standard. A plate thickness TD of each magnetic disk 18 is formed in 0.35 mm or more and 0.7 mm or less, and in the present embodiment, this is 0.635 mm. The distance between two adjacent magnetic disks 18, that is, a plate thickness TS (thickness in the axial direction) of the spacer ring 66 is formed in 1.2 mm or more and 1.5 mm or less. In the present embodiment, the plate thickness TS is based on the spacer ring 66 in 1.462 mm. The spacer ring 66 is formed of, for example, aluminum.

As described above, according to the present embodiment, ten magnetic disks 18 and nine spacer rings 66, which are one less than the number of magnetic disks, are stacked and disposed on the outer periphery of the hub 64 of the spindle motor 19. In the nine spacer rings, at least one spacer ring is formed in a thickness different from that of the other spacer rings. The thickness of the spacer ring 66 is set such that the difference between the maximum one and the minimum one is 0.01 mm or more and 0.09 mm or less.

FIG. 4 is a perspective view showing the actuator assembly. As shown in FIG. 4, the actuator assembly 22 includes an actuator block 29 having a through hole 26, a bearing unit (unit bearing) 28 provided in the through hole 26, a plurality of, e.g., 11 arms 32 extending from the actuator block 29, a suspension assembly (head gimbal assembly, sometimes referred to as HGA) 30 attached to each arm 32, and the magnetic head 17 supported on the suspension assembly 30. On the bottom wall 12a of the base 12, a support shaft (pivot) 31 is erected. The actuator block 29 is rotatably supported around the support shaft 31 by the bearing unit 28.

In the present embodiment, the actuator block 29 and the 11 arms 32 are integrally formed of aluminum or the like, and constitute a so-called F block. The arms 32 are each formed, for example, in an elongate flat plate shape, and extends from the actuator block 29 in a direction orthogonal to the support shaft 31. The 11 arms 32 are provided in parallel to each other at intervals therebetween.

The actuator assembly 22 includes a support frame 33 extending from the actuator block 29 in a direction opposite to the arms 32, and the support frame 33 supports a voice coil 39 forming a part of the VCM 24. As shown in FIG. 1, the voice coil 39 is located between a pair of yokes 37, one of which is fixed on the base 12, and the voice coil 39 constitutes the VCM 24 together with these yokes 37 and a magnet fixed to one of the yokes 37.

As shown in FIG. 4, the actuator assembly 22 comprises twenty suspension assemblies 30 which respectively support the magnetic heads 17. The suspension assemblies 30 are each attached to extending ends 32*a* of the respective arms 32. The suspension assemblies 30 include head-up suspension assemblies which support the respective magnetic heads 17 upward and head-down suspension assemblies which support the respective magnetic heads 17 downward. These head-up suspension assemblies and head-down suspension assemblies can be constituted by changing the disposition of the suspension assemblies 30 of the same structure upward or downward.

In this embodiment, as shown in FIG. 4, a head-down suspension assembly 30 is attached to the uppermost arm 32, and a head-up suspension assembly 30 is attached to the lowermost arm 32. A head-up suspension assembly 30 and a head-down suspension assembly 30 are attached to each of the nine arms 32 in the middle.

The suspension assemblies 30 each includes a substantially rectangular base plate 38, a load beam 42 formed of an elongated leaf spring, and an elongated band-shaped flexure (wiring member) 40. The flexure 40 comprises a gimbal portion that is displaced freely, and the respective magnetic head 17 is mounted on the gimbal portion. A proximal end portion of the base plate 38 is fixed to an installation surface (caulking surface) 32*b* (see FIG. 5) of the extension end 32*a* of the respective arm 32, and is crimped, for example.

The proximal end portion of the load beam 42 is fixed overlapping the end of the base plate 38. The load beam 42 extends from the base plate 38 and is formed to narrow down toward the extending end. The base plate 38 and the load beam 42 are formed of, for example, stainless steel.

The load beam 42 generates spring force (reaction force) that biases the respective magnetic head 17 toward the surface of the respective magnetic disk 18. Further, a tab 46 protrudes from the tip end of the load beam 42. The tab 46 is engageable with a ramp 80, which will be described later, and constitutes the ramp load mechanism 25 together with the ramp 80.

As shown in FIG. 4, the FPC unit 21 integrally has a base portion 21*a* bent into an L-shape in a substantially rectangular, a relay portion 21*b* in an elongated strip shape extending from one side edge of the base portion 21*a*, and a junction 21*c* provided continuously at the tip end of the relay part 21*b*. The base part 21*a*, the relay part 21*b*, and the junction 21*c* are formed of a flexible printed wiring board (FPC). The flexible printed wiring board has an insulating layer such as polyimide, a conductive layer formed on the insulating layer and formed with a plurality of wirings, connection pads, and the like, and a protective layer covering the conductive layer.

On the base portion 21*a*, electronic components such as conversion connectors and a plurality of capacitors (not shown) are mounted and are electrically connected to wirings (not shown). To the base portion 21*a*, a metal plate that functions as a reinforcing plate is attached. The base portion 21*a* is installed on the bottom wall 12*a* of the base 12. The relay portion 21*b* extends from the side edge of the base portion 21*a* toward the actuator block 29 of the actuator assembly 22. The junction 21*c* provided at the extending end of the relay portion 21*b* is formed in a rectangular shape having a height and a width substantially equal to that of the, side surface (installation surface) of the actuator block 29. The junction 21*c* is attached to the installation surface of the actuator block 29 through a backing plate made of aluminum or the like, and is further screwed and fixed to the installation surface with fixing screws 72. On the junction 21*c*, a large number of connection pads are provided. For example, one head IC (head amplifier) 67 is mounted on the junction 21*c*, and this head IC 67 is connected to the connection pads and the base part 21*a* through wiring lines. Further, the junction 21*c* is provided with connection terminals 68 to which the voice coil 39 is connected.

The flexure 40 of each suspension assembly 30 has one end portion electrically connected to the magnetic head 17, another end portion extending to the actuator block 29 through a groove formed on the side edge of the arm 32, and a connection end portion (tail connection terminal portion) 48*c* provided in the other end portion. The connection end portion 48*c* is formed in an elongated rectangular shape. On the connection end portion 48*c*, a plurality of, for example, thirteen connection terminals (connection pads) 51 are provided.

These connection terminals 51 are connected to the wiring lines of the flexure 40, respectively. More specifically, a plurality of wiring lines of the flexure 40 extend over substantially a full length of the flexure 40, and electrically connected to the magnetic head 17 by one-side ends and also connected to the connection terminal (connection pad) 51 by the other-side ends.

The connection terminal 51 provided in the connection end portion 48*c* of each of the twenty flexures 40 is joined to the connection pad of the junction 21*c*, and through the connection pad, is electrically connected to the wiring lines of the junction 21*c*. Thus, the twenty magnetic heads 17 of the actuator assembly 22 are each electrically connected to the base portion 21*a* via the wiring lines of the respective flexure 40, the connection end portion 48*c*, the junction 21*c* of the FPC unit 21 and the relay portion 21*b*.

In the state where the actuator assembly 22 configured as above is incorporated on the base 12, the support shaft 31 is set substantially parallel to the spindle of the spindle motor 19. Each magnetic disk 18 is located between two adjacent suspension assemblies 30. In the operation of the HDD, the Magnetic heads 17 supported by the two respective suspension assemblies 30 face the upper surface and the lower surface of the respective magnetic disks 18.

Figure 5:
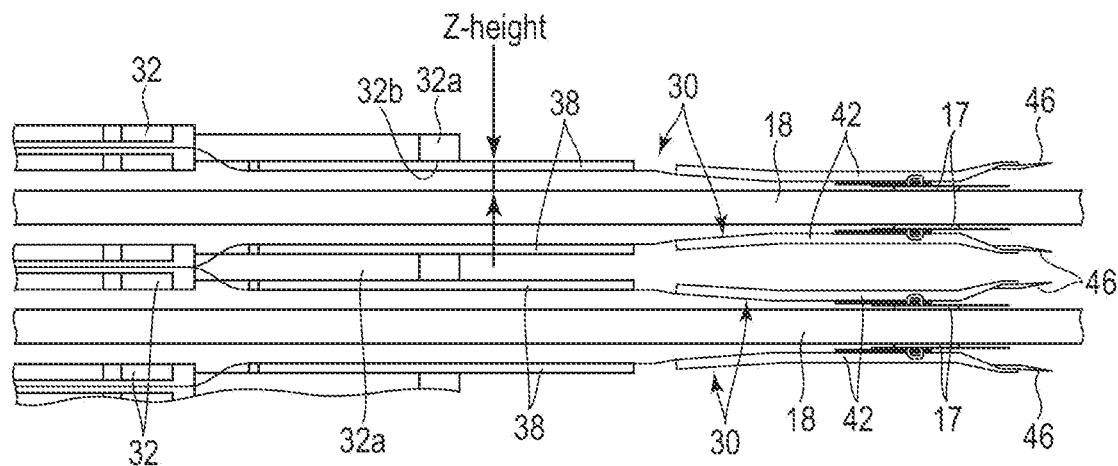
FIG. 5 is a side view showing the relationship of arrangement between the head suspension assembly and the magnetic disk of the head actuator assembly.

FIG. 5 is a side view showing the relationship of arrangement between the head suspension assembly 30 and the magnetic disk 18. As shown, when the HDD is operating, each magnetic disk 18 is sandwiched between the down-head suspension assembly 30 and the up-head suspension assembly 30. The magnetic heads 17 supported on the two suspension assemblies 30 face the upper surface and the lower surface of the magnetic disk 18, In FIG. 5, the distance between the installation surface 32*b* of the tip end portion 32*a* of the arm 32 and the surface of the magnetic disk 18 is referred to as a Z-height. According to the present embodiment, the installation height of the magnetic disk 18 is adjusted such that the Z height falls within an error range of ±0.06 mm to a predetermined design value.

Figure 6:
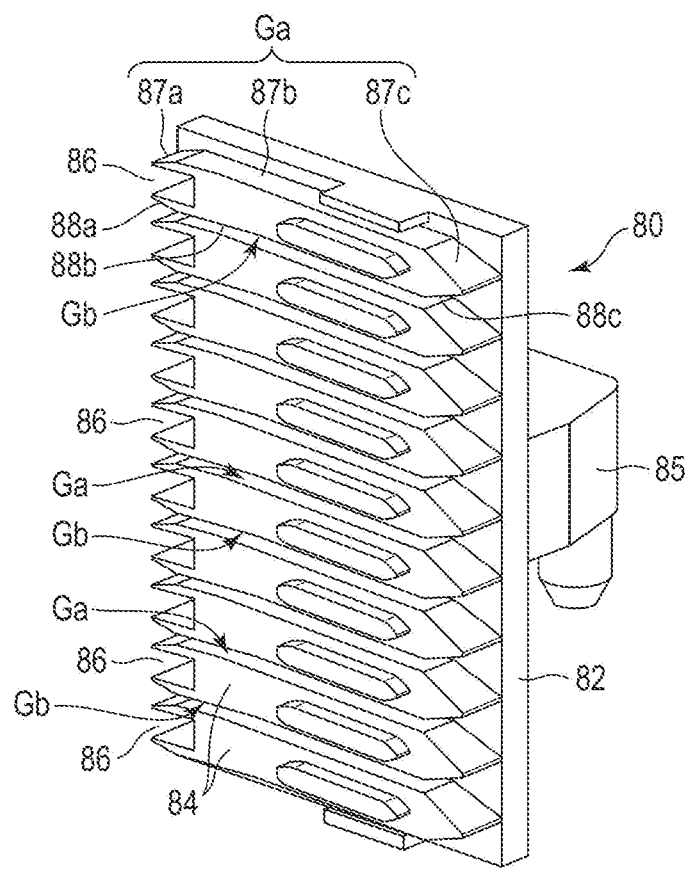
FIG. 6 is a perspective view showing the ramp of the HDD.
Figure 7:
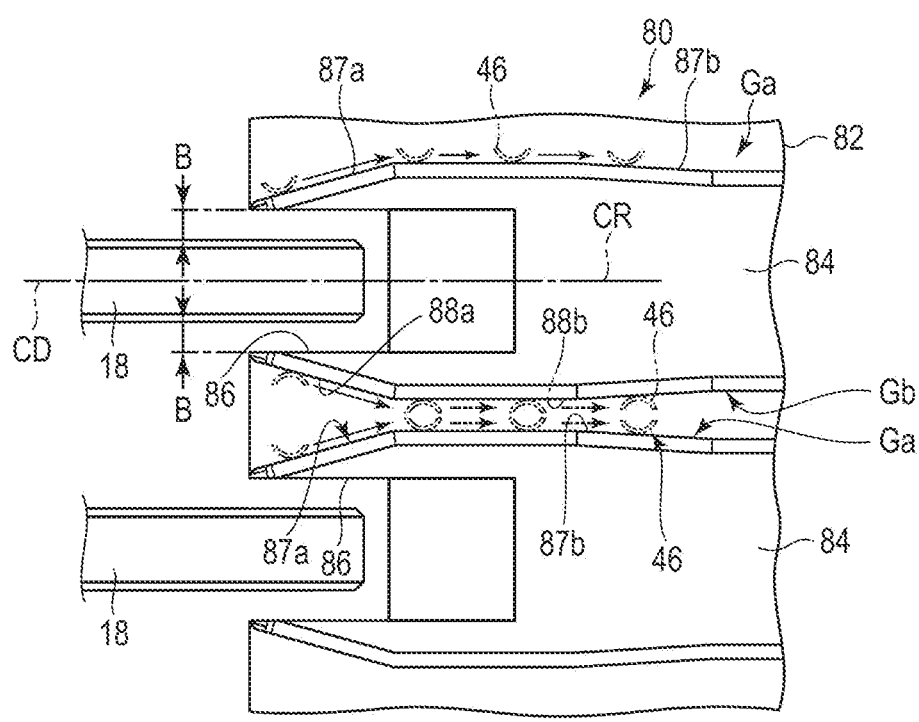
FIG. 7 is an enlarged side view showing the ruling pen part of the ramp.

Next, the ramp of the ramp load mechanism 25 and the relationship of arrangement between the ramp and the magnetic disk 18 will be described in detail. FIG. 6 is a perspective view showing a ramp of the ramp load mechanism, and FIG. 7 is a side view schematically showing an entrance (ruling pen) part of the ramp.

The ramp load mechanism 25 comprises a ramp 80. As shown in FIG. 1, the ramp 80 is fixed to the bottom wall 12*a* of the base 12 and is located near the circumferential portions of the magnetic disks 18. While the HDD is not in operation, if the magnetic heads 17 move off from the outer circumference of the magnetic disks 18 to a predetermined stop position, the tabs 46 of the suspension assemblies 30 climb up the ramp 80. Thus, the magnetic heads 17 can be held in a position off the magnetic disks 18.

As shown in FIG. 6, the ramp 80 includes a ramp body 82 formed into a rectangular plate shape, ten guide blocks 84 formed to project from one whole surface of the ramp body 82, and a support bracket 85 formed to project from another surface of the ramp body 82, which are formed, for example, of a synthetic resin or metal into one integral body. By fixing the support bracket 85 to the base 12, the ramp body 82 is disposed to rise up straight substantially perpendicular to the bottom wall 12a of the base.

The guide block 84 has an elongated rectangular parallelepiped shape and extends substantially parallel to the bottom wall 12a. The ten guide blocks 84 are disposed side by side at predetermined intervals in the axial direction of the magnetic disk 18. A rectangular recess (notch) 86 is formed in one end of each guide block 84, which is on a side of the magnetic disk 18. As shown in FIGS. 3 and 7, in the state where the ramp 80 is provided on the base 12, the outer circumferential portions of the ten magnetic disks 18 are located respectively in the recesses 86 of the corresponding guide block 84 with a gap B.

As shown in FIGS. 6 and 7, each guide block 84 comprises an upper guide surface (first guide surface) Ga which guides and supports the tab 46 of the down-head suspension assembly 30, and a lower guide surface (second guide surface) Gb which guides and supports the tab 46 of the up-head suspension assembly 30. The upper guide surface Ga and the lower guide surface Gb are located to oppose each other and provided substantially perpendicular to the whole surface of the ramp body 82.

The upper guide surfaces Ga and the lower guide surfaces Gb of the ten guide blocks 84 are arranged in the axial direction of the magnetic disk 18 at predetermined intervals therebetween, and are disposed according to the heights of the corresponding suspension assemblies 30, respectively. The guide surfaces Ga and Gb are expanded substantially in the radial direction of the respective magnetic disk 18, to near the outer circumferential edge of the magnetic disk 18, and are located on the movement paths of the tab 54.

The upper guide surface Ga includes a first slope 87a which inclines and extends from near the surface (near the recess 86) of the respective magnetic disk 18 towards a direction away from the magnetic disk 18, which is, here, upwards, so as to load and unload the respective magnetic head 17 on the magnetic disk 18, a support surface 87b which extends continuously from the first slope 87a to be substantially parallel to the surface of the magnetic disk 18, and a second slope 87c which inclines and extends from the other end of the support surface 87b to the terminal end, of the guide surface Ga.

Similarly, the lower guide surface Gb includes a first slope 88a which inclines and extends from near the surface (near the recess 86) of the respective magnetic disk 18 towards a direction away from the magnetic disk 18, which is, here, downwards, so as to load and unload the respective magnetic head 17 on the magnetic disk, a support surface 88b which extends continuously from the first slope 88a to be substantially parallel to the surface of the magnetic disk 18, and a second slope 88c which inclines and extends from the other end of the support surface 88b to the terminal end of the guide surface Gb.

As shown in FIG. 7, desirably, a gap B between the ramp 80 and the surface of the magnetic disk 18, which is one of the parameters that determine the shock proof to the operation of the magnetic disk device, is set to a predetermined value, for example, about 0.275 mm. Therefore, the installation height of the magnetic disk 18 is adjusted such that a central axis CD in the thickness direction of the magnetic disk 18 and a central axis CR in the height direction of the recess 86 of the ramp 80 match each other, or falls within ±0.06 mm of the error range.

In the HDD, the actuator assembly 22 is pivoted around the support shaft 31 by the VCM 24, and thus a plurality of magnetic heads 17 are each moved to a respective desired seeking position while they are facing the surfaces of the respective magnetic disks 18. When the HDD is not in operation, if the magnetic heads 17 are each moved off from the outer circumferences of the respective magnetic disk 18 to a predetermined stop position, the tabs 46 of the suspension assemblies 30 climb up the upper guide surface Ga and the lower guide surface Gb of the corresponding guide blocks of the ramp 80, respectively. Thus, the magnetic heads 17 can be held in the unloading positions off the magnetic disks 18.

Next, a method of manufacturing the HDD having the above configuration will be described.

In the above HDD, in the thickness of the magnetic disk 18 and the thickness of the spacer ring 66, desirably, the error from the design values is 0. However, a magnetic disk with a large area has to accept a variation of about ±0.01 mm, and a spacer ring with a small area has to accept a variation of about ±0.005 mm, due to manufacturing variations. However, as the number of mounted magnetic disks increases, the thickness and dimensional variations of magnetic disks and spacer rings to be stacked increase, and thus the upper magnetic disks have a large influence of variation. For example, in the case in which ten magnetic disks 18 are mounted, assuming that a magnetic disk 0.01 mm thicker than the design value and a spacer ring 0.005 mm thicker than the design value are stacked, the height of the top surface of the magnetic disk will have a displacement of 0.01×10+0.005×9=0.145 mm to the design value.

Therefore, in the HDD and the manufacturing method of the same according to the present embodiment, the height error of the magnetic disk is reduced by adjusting the thickness of the spacer ring.

Figure 8:
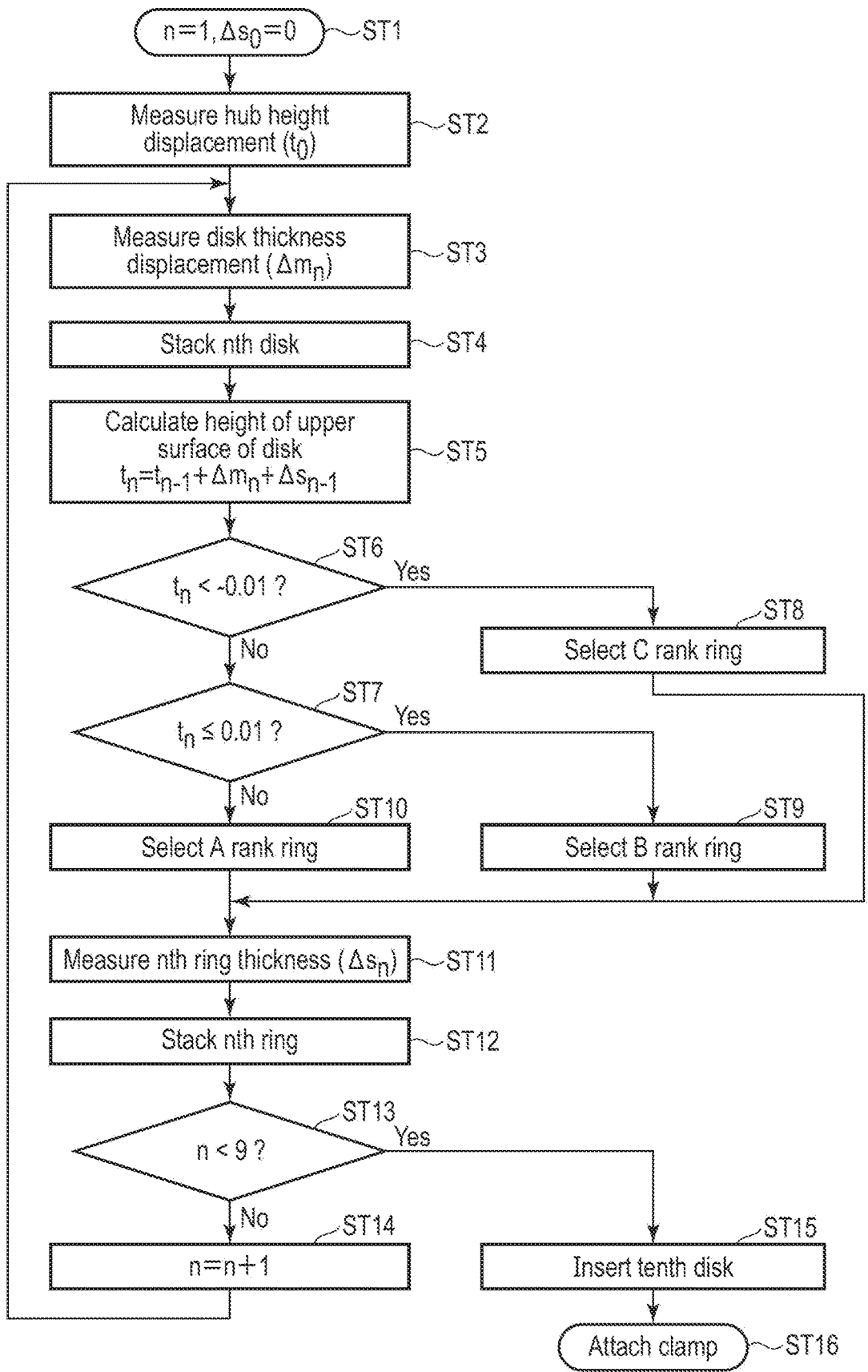
FIG. 8 is a flowchart showing the manufacturing process of the HDD.
Figure 9:
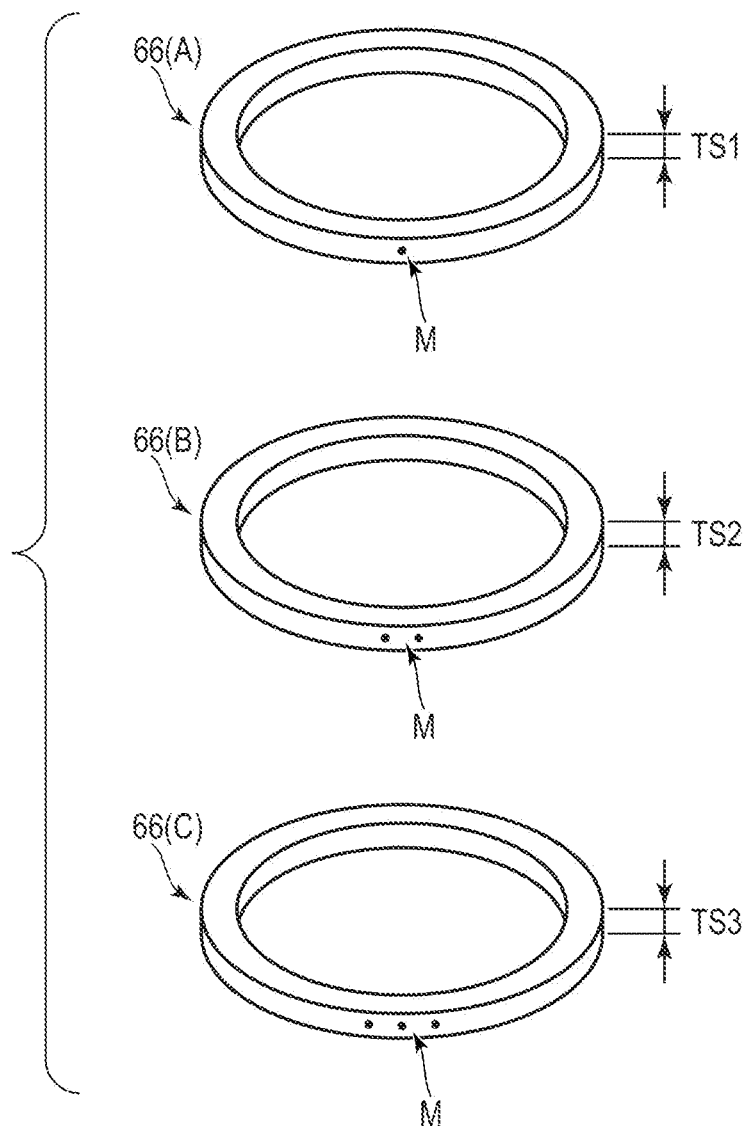
FIG. 9 is a perspective view showing three types of spacer rings.
Figure 10:
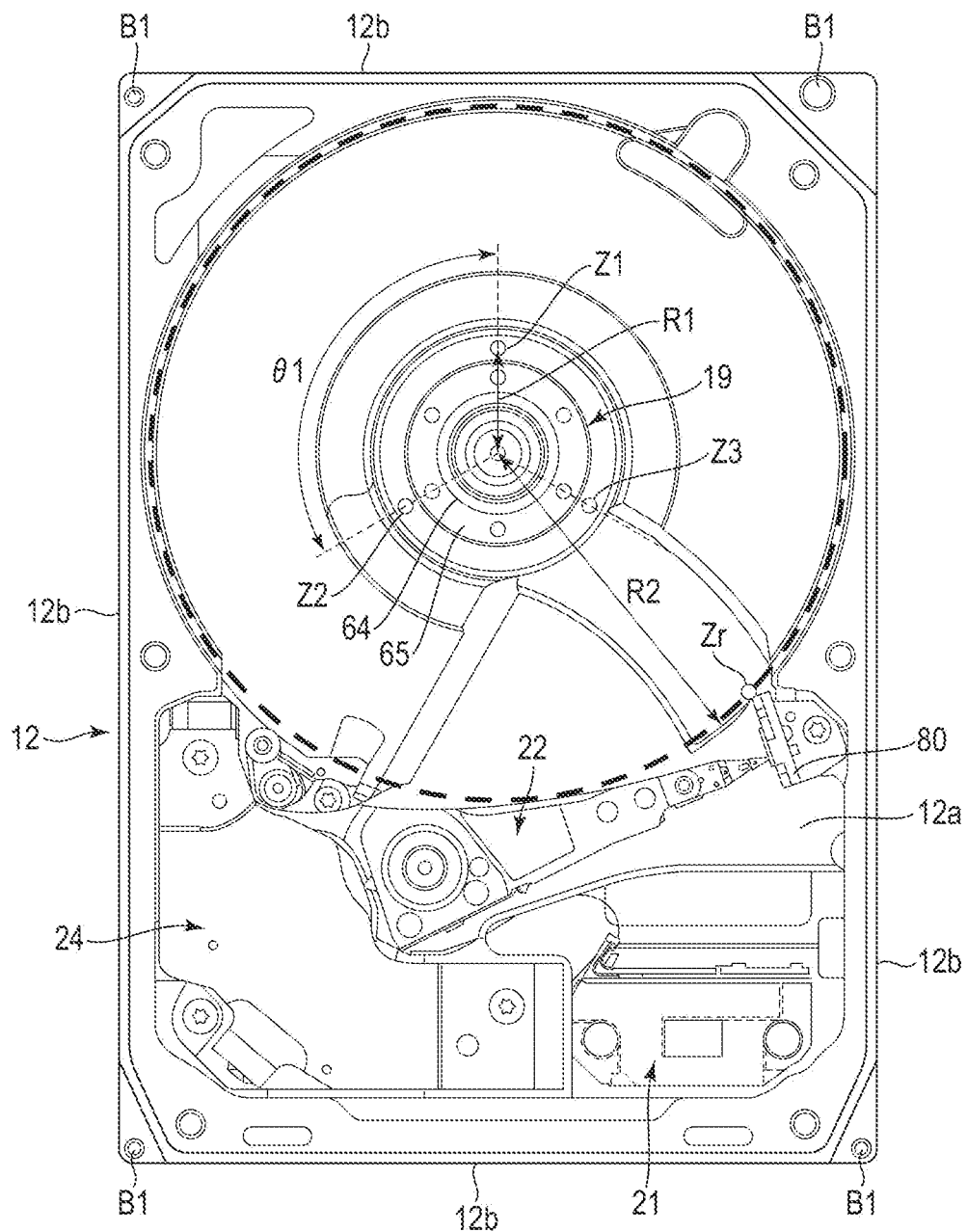
FIG. 10 is a plan view of the HDD with the magnetic disk removed.
Figure 11:
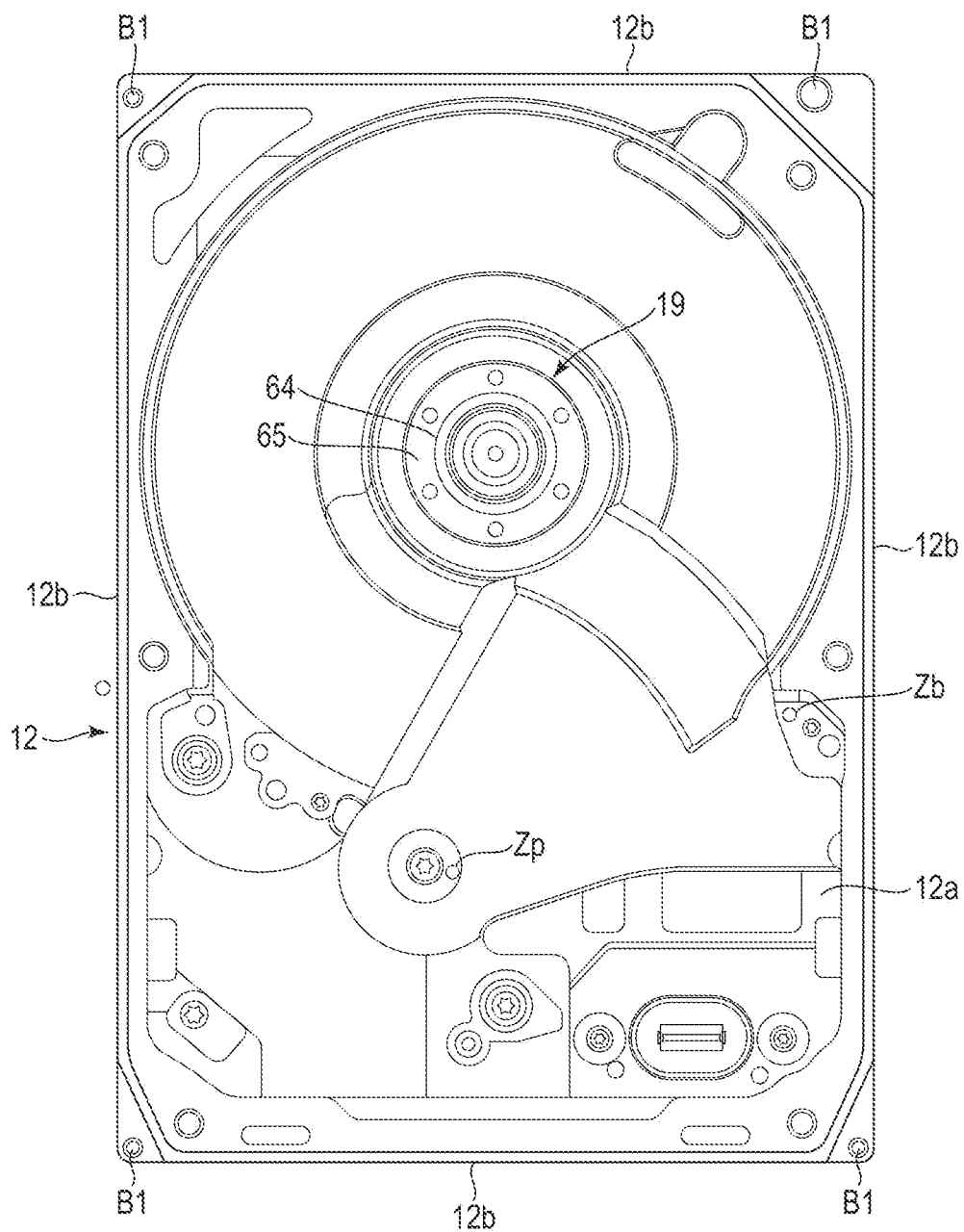
FIG. 11 is a plan view of the base of the HDD.

FIG. 8 is a flowchart showing a manufacturing process of the HDD, and FIG. 9 is a perspective view showing three types of spacer rings having different thicknesses. FIG. 10 is a plan view of the HDD with the magnetic disk removed, and FIG. 11 is a plan view of the base of the HDD.

As shown in FIG. 8, in the manufacturing method, first, it is assumed that the number of stacked spacer rings is n=1 (first sheet) and the error of the thickness of the magnetic disk 18 from the design center value is $\Delta s_0 = 0$ (ST1). The height of the top surface of the flange 65 of the hub 64 of the spindle motor 19 (ST2) is measured. In one example, as shown in FIG. 10, the height of the upper surface of the flange 65 is measured using, for example, a measuring device such as a laser displacement meter or a capacitance displacement meter with reference to the height of the upper surface of the four positioning bosses B1 provided on the base 12. The difference (height error) between the measured height and the design center value is $t_0$ (plus is in the case in which the hub 64 is on the top cover side), and the difference is managed linked to the spindle motor 19.

In the case of the present embodiment, $t_0$ is managed to be, for example, −0.05 mm or more and +0.05 mm or less, and a spindle motor exceeding this range is not used.

Subsequently, as shown in FIG. 8, the thickness of the inner circumferential part of the first magnetic disk 18 to be stacked is measured, and the difference (thickness error) between the measured thickness and the design center value is defined as $\Delta m_1$ (ST3). After measuring the thickness, the magnetic disk 18 is stacked on the flange 65 of the hub 64 (ST4).

For the spacer ring 66, two or more types of spacer rings having different design center values are prepared, for example, three types of spacer rings. As shown in FIG. 9, the present embodiment uses three types of spacer rings with different thicknesses, an A-rank spacer ring 66(A): thickness TS1: 1.452 mm±0.005 mm, a B-rank spacer ring 66(B): thickness TS2: 1.462 mm±0.005 mm, and a C-rank spacer ring 66(C): thickness TS3: 1.472 mm±0.005 mm (TS1<TS2<TS3). Since the thickness tolerance is ±0.005 mm, there is no spacer ring whose thickness overlaps the A, B, and C ranks.

Note that a mark M, for example, a dot may be attached to the spacer ring 66 in order to easily distinguish the types. The A-rank spacer ring 66(A) has one dot, the B-rank spacer ring 66(B) has two dots, and the C-rank spacer ring 66(C) has three dots. The mark M is not limited to dots, and various types such as barcodes can be selected.

Subsequently, as shown in FIG. 8, the sum of the difference $t_0$ linked to the spindle motor 19 and the difference $\Delta m_1$ of the stacked magnetic disk 18 is calculated as a surface height $t_1$ of the first magnetic disk 18 (ST5). The rank of the first spacer ring 66 to be stacked is determined according to the size of $t_1$ (ST6 to ST10).

If $t_1 < -0.01$ (ST6), C-rank spacer ring 66(C) is selected (ST8).

If $-0.01 \leq t_1 \leq 0.01$ (ST7), B-rank spacer ring 66(B) is selected (ST9).

If $0.01 < t_1$ (ST7), A-rank spacer ring 66(A) is selected (ST10).

The thickness of the first spacer ring 66 selected is measured, and the error of the measured value from the design center value is defined as $\Delta s_1$ (ST11). After the measurement, the spacer ring 66 is stacked and disposed on the first magnetic disk 18 (ST12).

In the case in which the number of stacked spacer rings 66 is less than nine (ST13), n=n+1 is set (ST14), and the steps (ST3) to (ST13) are repeatedly executed. That is, subsequently, the second magnetic disk 18 is stacked on the spacer ring 66. The thickness of the inner circumferential part of the magnetic disk 18 is measured before stacking, and the error of the measured value from the design center value is defined as $\Delta m_2$ (ST3). The second magnetic disk 18 measured is stacked on the spacer ring 66 (ST4).

Before stacking the second spacer ring, the height of the top surface of the second magnetic disk 18 ($t_2 = t_1 + \Delta s_1 + \Delta m_2$) is calculated (ST5). The rank of the spacer ring to be stacked on the second sheet is determined according to the size of the height $t_2$ (ST6 to ST10).

If $t_2 < -0.01$ (ST6), 0-rank spacer ring 66(C) is selected (ST8).

If $-0.01 \leq t_2 \leq 0.01$ (ST7), B-rank spacer ring 66(B) is selected (ST9).

If $0.01 < t_2$ (ST7), A-rank spacer ring 66(A) is selected (ST10).

The thickness of the second spacer ring 66 selected is measured, and the error of the measured value from the design center value is defined as $\Delta s_2$ (ST11). After the measurement, the spacer ring 66 is stacked and disposed on the second magnetic disk 18 (ST12).

The above-described Steps ST3 to ST12 are repeatedly executed until the nine magnetic disks 18 and the nine spacer rings 66 are stacked. When the ninth spacer ring 66 is stacked (ST13), the tenth magnetic disk 18 is stacked and disposed on the spacer ring 66 (ST15). The clamp spring 20 is then attached to the hub 64, and the clamp spring 20 holds the ten magnetic disks 18 and the nine spacer rings 66 in a stacked state (ST16).

As described above, according to the present embodiment, ten magnetic disks 18 and nine spacer rings 66, which are one less than the number of magnetic disks, are stacked and disposed on the outer periphery of the hub 64 of the spindle motor 19. In the nine spacer rings, at least one spacer ring is formed in a thickness different from that of the other spacer rings. The thickness of the spacer ring 66 is set such that the difference between the maximum one and the minimum one is 0.01 mm or more and 0.09 mm or less.

According to the present embodiment, spacer rings having an optimum thickness are selected, stacked, and disposed according to the height error of the flange 65 and the thickness error of the magnetic disk 18. As a result, it is possible to stack and dispose ten magnetic disks 18 at a desired height position without with no magnetic disk that causes a height error exceeding the height error (0.06 mm at the maximum) of the first stacked magnetic disk 18. It is possible to keep the Z height of each suspension assembly 30 and the height position of the central axis CD of each magnetic disk 18 to the ramp 80 within the range of desired design values. Even in the case in which a large number of disks, for example, ten magnetic disks 18 are mounted, there are no problems such as floating fluctuation of the magnetic head or the head actuator not being able to perform normal load/unload operation. It is possible to achieve a large capacity of the disk device.

Next, an HDD and a manufacturing method of the same according to another embodiment of the present invention will be described. In the other embodiments described below, the same reference numerals, are given to the same parts as those of the first embodiment described above, and the detailed description is omitted or simplified. The parts different from the first embodiment are mainly described.

Second Embodiment

Referring to FIGS. 7, 8, and 10, a manufacturing method of an HDD according to a second embodiment will be described.

As shown in FIG. 7, in order that a magnetic head reliably performs load/unload between a magnetic disk 18 and a ramp 80, an error from the design center value of a relative height B between the magnetic disk 18 and the ramp 80 is desirably small.

In the first embodiment described above, the error of the height of the flange 65 of the hub 64 of the motor from the design value is used as $t_0$ in FIG. 8. However, in the second embodiment, the error of the height of a flange 65 to the height of a ramp 80 is used as $t_0$.

In detail, as shown in FIG. 10, the height of the upper surface of the flange 65 is measured at three points, Z1, Z2, and Z3 of the upper surface of the flange 65 with reference to the upper surface of a boss B1. The height error from the design value of a virtual point Zr, which is an extension of the plane formed by the heights of the three points to the position near the ramp 80 (radius R2), is used as to. In the present embodiment, Z1, Z2, and Z3 are disposed at equal intervals of an angle θ1=120° in the circumferential direction around the central axis of a spindle motor 19. Z1, Z2, and Z3 are each placed at a position with a radius of R1=14.5 mm, and Zr is set at a position with a radius of R2=46.6 mm.

With the error $t_0$, Steps ST1 to ST16 shown in FIG. 8 are performed, ten magnetic disks 18 and nine spacer rings are stacked and disposed on the flange 65 of the hub 64.

According to the second embodiment described above, as in the first embodiment, the spacer ring having the optimum thickness is selected, stacked, and disposed according to the height error of the flange 65 and the thickness error of the magnetic disk 18, it is possible to stack and dispose ten magnetic disks 18 at a desired height position to the ramp 80. Further, in the second embodiment, the height error of the magnetic disk 18 at the position near the ramp 80 caused by the inclination of the hub 64 can be taken into consideration, and thus it is possible to perform height adjustment more effectively.

Third Embodiment

Referring to FIGS. 3 and 8, a manufacturing method of an HDD according to a third embodiment will be described.

As shown in. FIG. 3, a magnetic disk 18 and a spacer ring 66 stacked on a hub 64 of a spindle motor 19 are fixed to the hub 64 in a state in which the magnetic disk 18 and the spacer ring 66 are axially pressed by a clamp spring 20. For example, in the case of stacking ten magnetic disks 18 with a thickness of 0.635 mm, in order to hold the magnetic disk 18 with no error even with an impact of about 200 G, it is necessary to apply an axial force of about 1,200 N to the magnetic disk 18. Due to this axial force, a flange 65 of the hub 64 may also be slightly deformed, and the height position of the mounted magnetic disk 18 may change by about 0.01 mm. Such a change becomes a factor of a height error of the magnetic disk.

Therefore, in the third embodiment, the amount of deflection Ah of the flange 65 generated by the load of the clamp spring 20 is obtained in advance using another sample, and Δh is subtracted from $t_0$ measured in Step ST2 in FIG. 8. After that, Steps ST3 to ST16 shown in FIG. 8 are executed with reference to ($t_0$- Δh), ten magnetic disks 18 and nine spacer rings are stacked and disposed on the flange 65 of the hub 64.

According to the third embodiment, it is possible to appropriately select the rank of the spacer ring 66 in consideration of the height error Ah of the flange 65 due to the deformation when the clamp spring is attached, and it is possible to adjust the height of the magnetic disk more effectively after clamping. That is, it is possible to adjust the height such that the height error of the flange due to the clamp spring does not propagate as the height error of the magnetic disk that does not directly contact the flange, or the height error of the magnetic disk is reduced.

Fourth Embodiment

Referring to FIGS. 7, 8, and 11, a manufacturing method of an HDD according to a fourth embodiment will be described.

As shown in FIG. 7, in order that a magnetic head reliably performs load/unload between a magnetic disk 18 and a ramp 80, an error from the design center value of a relative height B between the magnetic disk 18 and the ramp 80 is desirably small.

As shown in FIG. 11, an installation surface Zb of the ramp 80 is formed on the inner surface of a bottom wall 12a of a base 12. Although the installation surface Zb is formed with high accuracy by machining, even in that case, a processing variation of about ±0.03 mm in the height direction is unavoidable. Therefore, in the fourth embodiment, the height of the ramp installation surface Zb is measured with reference to the upper surface of a boss B1, and an error ΔZb of the measured value from the design center value is calculated. In Step ST2 in FIG. 8, ΔZb is subtracted from the measured $t_0$. After that, Steps ST3 to ST16 shown in FIG. 8 are executed with reference to ($t_0$-ΔZb), ten magnetic disks 18 and nine spacer rings are stacked and disposed on a flange 65 of a hub 64.

According to the fourth embodiment, the height error ΔZb of the ramp installation surface is subtracted, it is possible that the thickness of the spacer ring 66 is selected so as to reduce the influence of the height error of the ramp installation surface and the height position of the magnetic disk is optimally adjusted.

Fifth Embodiment

Referring to FIGS. 8 and 11, a manufacturing method of an HDD according to a fifth embodiment will be described.

As shown in FIG. 11, an installation surface Zp of a head actuator assembly 22 is formed on the inner surface of a bottom wall 12a of a base 12. On this installation surface Zp, a pivot 31 that rotatably supports an actuator block is installed. The installation surface Zp is formed with high accuracy by machining. However, even in that case, a processing variation of about ±0.03 mm in the height direction is unavoidable.

When the height of the installation surface Zp is displaced from a design value, the height positions of the actuator assembly 22 and a suspension assembly 30 are displaced. The error of the height position of the suspension assembly 30 causes the error of the Z height, which is a factor of the floating fluctuation of the magnetic head. Therefore, the error of the Z height from the design center value is desirably small.

Therefore, according to the fifth embodiment, the height of the head actuator installation surface Zp is measured with reference to the upper surface of a boss B1, and the error ΔZp of the measured value from the design center value is calculated. In Step ST2 in FIG. 8, ΔZp is subtracted from the measured $t_0$. After that, Steps ST3 to ST16 shown in FIG. 8 are executed with reference to ($t_0$-ΔZp), ten magnetic disks 18 and nine spacer rings are stacked and disposed on a flange 65 of a hub 64.

According to the fifth embodiment, it is possible to appropriately select the rank of the spacer ring 66 in consideration of the height error of the actuator installation surface Zp, that is, the height error (ΔZp) of the suspension assembly 30, and it is possible to adjust the height position of the magnetic disk and the Z height more effectively. That is, it is possible to adjust the height such that the height error of the installation surface Zp does not propagate as the height error of the magnetic disk that does not directly contact the flange, or the height error of the magnetic disk is reduced.

Sixth Embodiment

Figure 12:
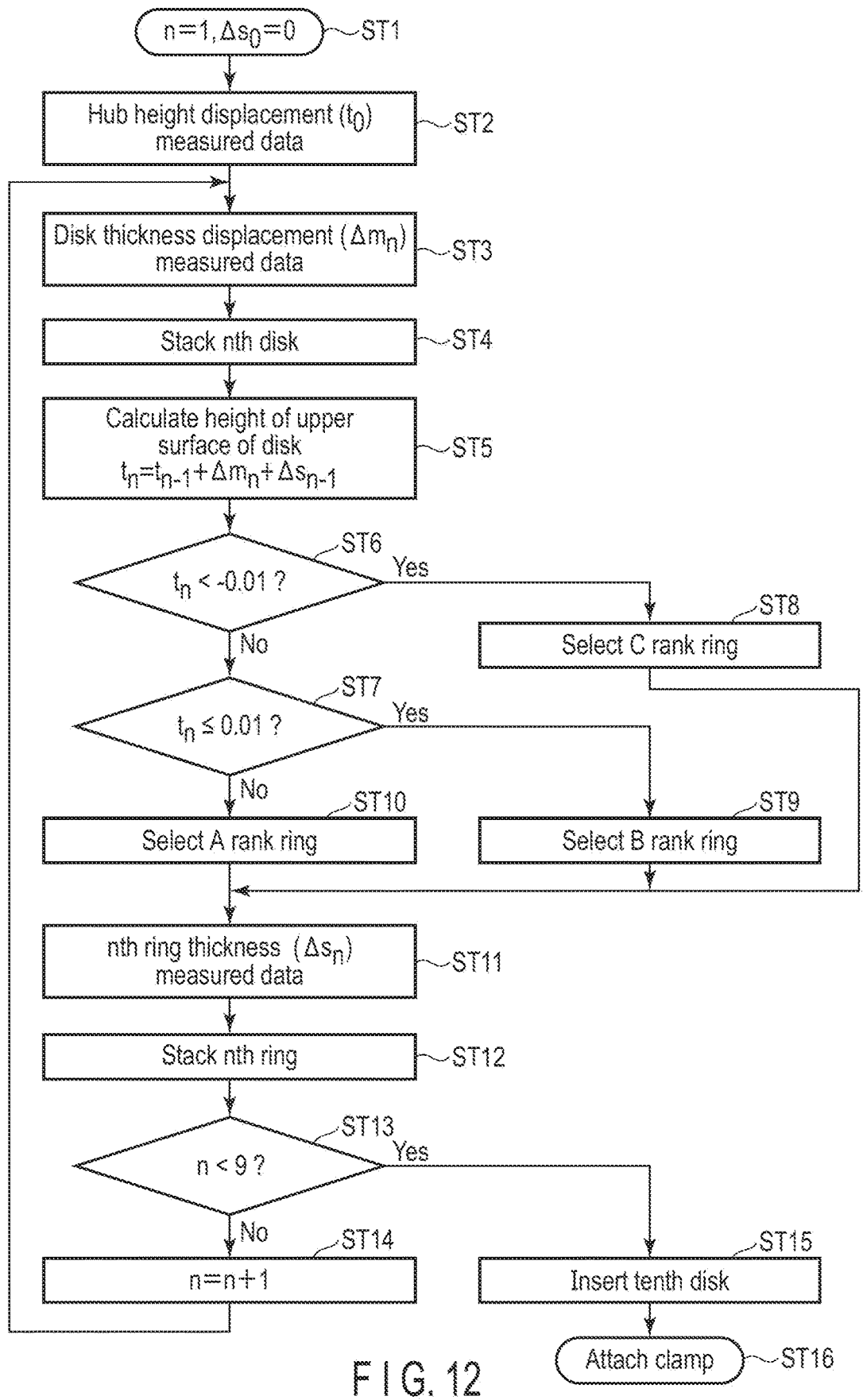
FIG. 12 is a flowchart showing an HDD manufacturing process according to a sixth embodiment.

FIG. 12 is a flowchart showing a manufacturing method of an HDD according to a sixth embodiment.

In the first to fifth embodiments described above, the height error $t_0$ of the flange of the spindle motor, the thickness error Δm of the magnetic disk 18, and the thickness error Δs of the spacer ring 66 are sequentially measured in the manufacturing process of the HDD while sequentially measuring the magnetic disk, which is the method of stacking spacer rings.

On the other hand, according to the sixth embodiment, the height error $t_0$ of the flange 65 of the spindle motor, the thickness error Am of each magnetic disk 18, and the thickness As of each spacer ring 66 are measured in advance for each component. However, the measured values are linked and stored for each individual or as a lot average value, and each measured value is used as data at the time of manufacturing.

As shown in FIG. 12, first, the height error $t_0$ of the flange is read (ST1), and then the thickness error $\Delta m_1$ of the first magnetic disk is read (ST2). Next, after stacking the first magnetic disk on the flange 65 (ST4), the height error $(t_1=t_0+\Delta m_1)$ of, the upper surface of the first magnetic disk is calculated (ST5).

The optimum spacer ring 66 is selected according to the magnitude of the calculated error $t_1$, and the data of the thickness error $\Delta s_1$ of the selected spacer ring is read out (ST6 to ST11).

In the case in which the number of stacked spacer rings 66 is less than nine (ST13), n=n+1 is set (ST14), and the steps (ST3) to (ST13) are repeatedly executed. That is, subsequently, the second magnetic disk 18 is stacked on the spacer ring 66. After stacking, the thickness error $\Delta m_2$ of the second magnetic disk 18 is read out, and the height $(t_2=t_1+\Delta s_1+\Delta m_2)$ of the upper surface of the second magnetic disk 18 is calculated (ST5). The rank of the spacer ring to be stacked on the second sheet is determined according to the size of the height $t_2$ (ST6 to ST10).

After reading the thickness error $\Delta s_2$ of the selected second spacer ring 66 (ST11), the spacer ring 66 is stacked and disposed on the second magnetic disk 18 (ST12).

The above-described Steps ST3 to ST12 are repeatedly executed until the nine magnetic disks 18 and the nine spacer rings 66 are stacked. When the ninth spacer ring 66 is stacked (ST13), the tenth magnetic disk 18 is stacked and disposed on the spacer ring 66 (ST15). The clamp spring 20 is then attached to the hub 64, and the clamp spring 20 holds the ten magnetic disks 18 and the nine spacer rings 66 in a stacked state (ST16).

In accordance with such a manufacturing method according to the sixth embodiment, it is possible to improve the manufacturing efficiency as compared with the method of measuring the error amount for each process.

Seventh Embodiment

Figure 13A:
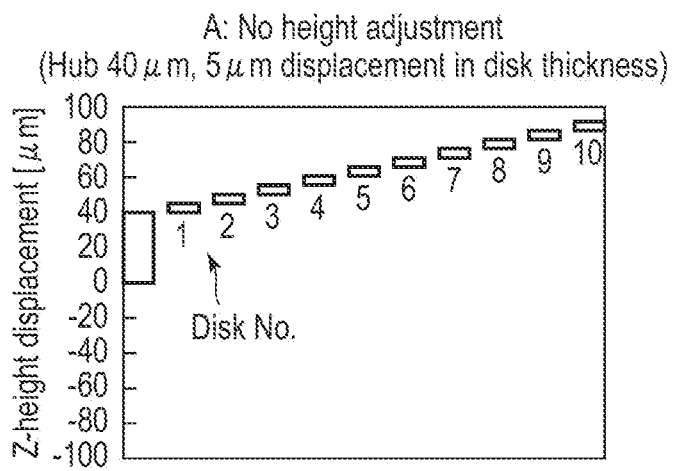
FIG. 13A is a diagram schematically showing the relationship between Z-height error (displacement) and height adjustment (without height adjustment) in a manufacturing method of an HDD according to a seventh embodiment.
Figure 13B:
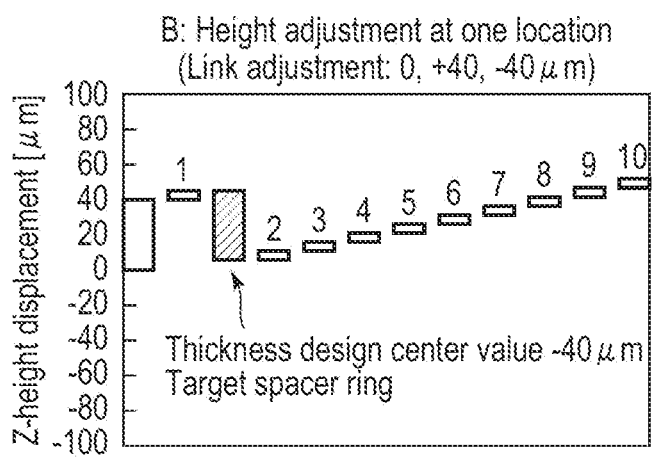
FIG. 13B is a diagram schematically showing the relationship between Z-height error and height adjustment (height adjustment at one location) in the manufacturing method of an HDD according to the seventh embodiment.
Figure 13C:
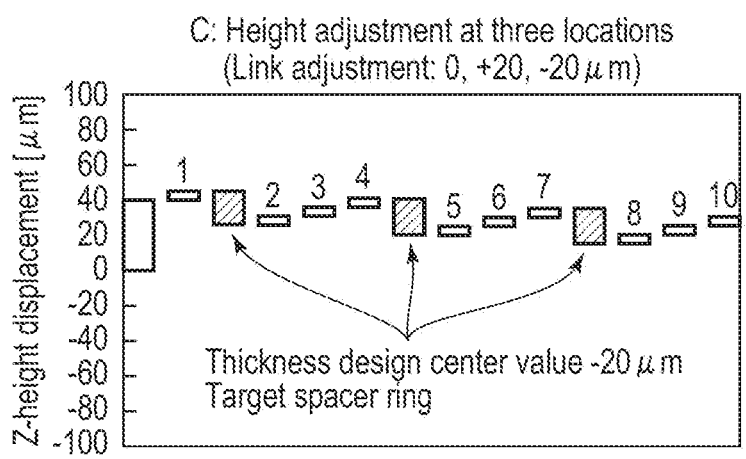
FIG. 13C is a diagram schematically showing the relationship between Z-height error and height adjustment (height adjustment at two locations) in the manufacturing method of an HDD according to the seventh embodiment.

FIGS. 13A, 13B, and 13C are diagrams schematically showing the relationship between Z-height error and height adjustment in a manufacturing method of an HDD according to a seventh embodiment.

According to the seventh embodiment, instead of selecting the thickness rank for all spacer rings 66 to be stacked, the thickness rank of the spacer ring is selected only a few times, and for the other spacer rings, a B-rank spacer ring is used, for example.

For example, in the case in which there are ten magnetic disks to be stacked, the average magnetic disk thickness is +0.005 mm (5 μm) at the design center value, and the height error of a flange 65 is +0.04 mm (40 μm), when magnetic disks and spacer rings are stacked without selecting the rank of spacer ring 66 (A. No height adjustment), the height error that occurs in the case of stacking the tenth magnetic disk is +0.09 mm, as shown in FIG. 13A.

On the other hand, according to the present embodiment, as shown in FIG. 13B, for example, the spacer ring 66 that has a thickness of −0.05 mm rank relative to the design center value is selected and stacked between the first and second magnetic disks. In this case, the stacking height error of the upper surface of the tenth magnetic disk can be suppressed to +0.05 mm even though the rank of the spacer ring 66 is selected only once.

Furthermore, in the case in which the rank selection of the spacer ring 66 is increased to three times, for example, as shown in FIG. 13O, a spacer ring with a rank of −0.02 mm to the design center value is selected for a spacer ring 66 inserted between the first and second magnetic disks, between the fourth and fifth magnetic disks, and between the seventh and eighth magnetic disks, and thus it is possible to suppress the stacking height error of, the top surface of the tenth magnetic disk to +0.04 mm.

As described above, according to the seventh embodiment, the thickness rank of the spacer ring is selected only a few times, and for the other spacer rings, a spacer ring in the thickness center rank, for example, the B-rank spacer ring. Thus, it is possible to reduce the height error of the magnetic disk, simplify the stacking equipment for the magnetic disk, and intend to improve the manufacturing efficiency.

As described above, in accordance with the HDD according to the foregoing embodiments, the spacer ring having the optimum thickness is selected, stacked, and disposed according to the height error of the flange 65 and the thickness error of the magnetic disk 18. The magnetic disks 18 and the spacer ring 66, which is one less than the number of magnetic disks, are stacked and disposed on the outer periphery of the hub 64 of the spindle motor 19. In the spacer rings, at least one spacer ring is formed to have a thickness different from that of the other spacer rings. The thickness of the spacer ring 66 is set such that the difference between the maximum one and the minimum one is 0.01 mm or more and 0.09 mm or less.

Consequently, according to the foregoing embodiments, it is possible to provide a disk device capable of reducing the height error of magnetic disks stacked and disposed and a method of manufacturing a disk device.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms, or modifications as would fall within the scope and spirit of the inventions.

In the foregoing embodiments, the number of installed magnetic disks is not limited to ten, which may be 11 or more. The thickness of the magnetic disk is not limited to 0.635 mm or 0.5 mm, which can be variously changed as necessary. Similarly, the diameter of the magnetic disk is not limited to 96 mm, which may be, for example, 95 mm or 97 mm. The material for forming the magnetic disk is not limited to aluminum, which may be glass or the like. The material for forming the spacer ring is not limited to aluminum, which may be, for example, titanium, stainless steel, glass, or the like.

The measurement of the ramp installation surface of the base of the housing, the actuator installation surface, and the flange height, the measurement of the magnetic disk thickness, and the measurement of the spacer ring thickness may be performed in advance for each component, and the measured values may be used. As the thickness of the magnetic disk, the lot average value or the average value for each cassette may be used instead of the individual thicknesses. Further, ramps and actuators having different heights may be used or the height of the ramp or actuator may be adjusted according to the height error of the stacked magnetic disks and the height error of the ramp installation surface and the actuator installation surface.

What is claimed is:

1. A disk device comprising:
a housing comprising a base with a bottom wall;
a drive motor comprising a pivot erected on the bottom wall, and a hub rotatably supported around the pivot, the hub including an outer circumferential surface coaxially located with the pivot and an annular flange provided at an end portion of the outer circumferential surface on a side of the bottom wall;
ten or more magnetic disks attached to the hub and stacked on the flange; and
a plurality of spacer rings attached to the hub and each disposed between each respective adjacent pair of two magnetic disks, the spacer rings being stacked on the flange together with the magnetic disks, a number of the spacer rings being one less than the magnetic disks, wherein
at least one spacer ring has a thickness different from that of the other spacer rings, and a difference between a maximum thickness and a minimum thickness of the spacer rings is 0.01 mm or more and 0.09 mm or less.

2. The disk device of claim 1, wherein
the at least one spacer ring is a spacer ring stacked on a magnetic disk closest to the flange.

3. The disk device of claim 1, wherein
a plural spacer rings among the spacer rings are formed to have a thickness different from that of the other spacer rings, and a difference between a maximum thickness and a minimum thickness of the spacer rings is 0.01 mm or more and 0.09 mm or less.

4. The disk device of claim 1, further comprising
a head actuator comprising an actuator block rotatably supported on the bottom wall, a plurality of arms each extending from the actuator block and including an installation surface at an extension end, and a plurality of suspension assemblies fixed to the installation surface, each of the suspension assemblies including a support plate extending from the arm and a magnetic head supported on the support plate, wherein
a distance between the installation surface of the arm and a surface of the magnetic disk opposite to the arm is set within an error range of ±0.06 mm to a predetermined design value.

5. The disk device of claim 1, further comprising
a ramp provided on the bottom wall and disposed adjacent to an outer circumferential portion of the magnetic disks, wherein
the ramp includes a plurality of recesses in which the outer circumferential portions of the respective magnetic disks are disposed, and a pair of guide surfaces extending from a vicinity of each recess and opposite to each other, and a central axis in a thickness direction of the magnetic disk and a central axis in a height direction of the recess of the ramp match each other, or are within an error range of ±0.06 mm.

6. The disk device of claim 1, wherein
the housing is filled with a low-density gas having a density lower than that of air.

7. The disk device of claim 1, wherein
the housing has a maximum height of 26.1 mm or less, specified by 3.5-inch disk device standards.

8. A method of manufacturing a disk device including a housing comprising a base with a bottom wall, a drive motor including a pivot erected on the bottom wall, and a hub rotatably supported around the pivot, the hub including an outer circumferential surface coaxially located with the pivot and an annular flange provided at an end portion of the outer circumferential surface on a side of the, bottom wall, ten or more magnetic disks attached to the hub and stacked on the flange, and a plurality of spacer rings attached to the hub and each disposed between each respective adjacent pair of two magnetic disks, the spacer rings being stacked on the flange together with the magnetic disks, a number of the spacer rings being one less than the magnetic disks; the method comprising:
preparing two or more types of spacer rings having different thicknesses in which at least one spacer ring is formed in a thickness different from that of other spacer rings, a difference between a maximum thickness and a minimum thickness of the spacer rings is 0.01 mm or more and 0.09 mm or less;
measuring a height of the flange to calculate height error from a predetermined design center value;
measuring a thickness of a first magnetic disk to calculate a thickness error from a specified design center value;
stacking the first magnetic disk on the flange;
calculating a height error of an upper surface of the first magnetic disk stacked from the height error of the flange and the thickness error of the first magnetic disk;
selecting a spacer ring having a thickness that reduces the height error from the two or more types of spacer rings according to a size of the calculated height error of the upper surface;
measuring a thickness of the selected spacer ring to calculate a thickness error from a predetermined design center value;
stacking the selected spacer ring on the first magnetic disk; and
repeating, to a second magnetic disk and subsequent magnetic disks and a second spacer ring and subsequent spacer rings, measurement of the thickness, calculation of a thickness error from a predetermined design center value, stacking, calculation of a height error of a top surface of the magnetic disk, and selection of a spacer ring, to sequentially stack ten or more magnetic disks and nine or more spacer rings.

* * * * *